United States Patent [19]

Perkins

[11] Patent Number: 4,565,559
[45] Date of Patent: Jan. 21, 1986

[54] PROTECTION DEVICE FOR BASALT DRAIN BUSHINGS

[75] Inventor: Richard A. Perkins, Newark, Ohio

[73] Assignee: Owens-Corning Fiberglas Corporation, Toledo, Ohio

[21] Appl. No.: 670,464

[22] Filed: Nov. 13, 1984

Related U.S. Application Data

[63] Continuation-in-part of Ser. No. 478,578, Mar. 24, 1983, abandoned.

[51] Int. Cl.[4] .............................................. C03B 37/02
[52] U.S. Cl. ................................................ 65/2; 65/1; 65/327
[58] Field of Search ............ 65/1, 326, 327, 2, 374.11, 65/DIG. 4

[56] References Cited

U.S. PATENT DOCUMENTS

| | | | |
|---|---|---|---|
| 1,603,221 | 10/1926 | Thomson | 65/327 X |
| 1,853,843 | 4/1932 | Bates et al. | 373/35 |
| 2,186,718 | 1/1940 | Ferguson | 373/35 X |
| 3,078,695 | 2/1963 | Kozak et al. | 373/35 X |
| 3,244,495 | 4/1966 | Apple et al. | 65/327 X |
| 3,244,496 | 4/1966 | Apple et al. | 65/327 X |
| 4,213,002 | 7/1980 | Pieper | 373/35 |
| 4,402,724 | 9/1983 | Weisenburger et al. | 65/326 |

*Primary Examiner*—Robert Lindsay
*Attorney, Agent, or Firm*—Ronald C. Hudgens; Robert F. Rywalski; Charles E. Moore

[57] ABSTRACT

This invention relates to a method of retarding bushing degradation by glass batch containing iron oxide. The problem is solved by substantially eliminating the passage of current directly through the bushing for heating and employing a conductive heating means to an electrically insulated bushing.

7 Claims, 1 Drawing Figure

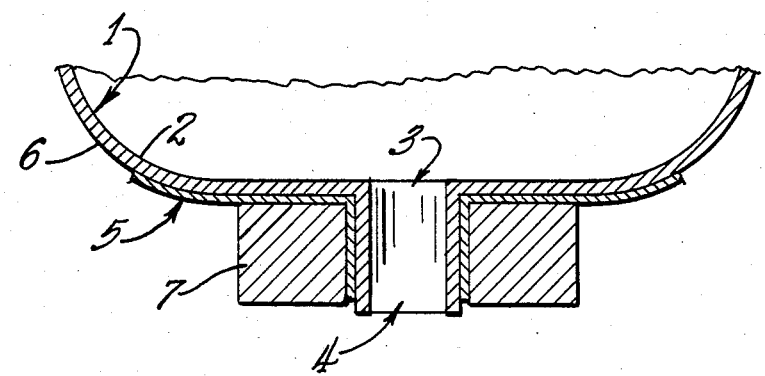

PROTECTION DEVICE FOR BASALT DRAIN BUSHINGS

CROSS REFERENCES

This application is a continuation-in-part of Ser. No. 478,578 filed on March 24, 1983 now abandoned.

TECHNICAL FIELD

This invention pertains to the production of glass fibers, i.e., fibers made by melting particulate batch ingredients or minerals. More particularly, it is directed to melting a high iron oxide containing glass batch, e.g., basalt and the like, in an electric furnace which uses an arc and/or electrode for causing current to flow through the batch for melting said batch ingredients by Joule effect. The melted glass is fed from what is called a drain bushing to a spinner where it is centrifugally ejected through the holes in the walls to form a glass "wool" which is collected in the form of mats or packs.

BACKGROUND OF THE INVENTION

One aspect of the invention relates to protecting the drain bushing when iron oxide is present in the molten material. In one of its more specific aspects, this invention relates to a method for protecting drain bushings from deterioration due to a cathodic dc bias.

Various platinum and related platinum alloys have been developed which are directed to resisting the heat and chemical attack to which such drain bushings are normally subjected during glass manufacturing. However, when the glass and the batch contain iron oxide, the electrical potential within the furnace can establish an electrochemical reaction with the bushing material. This current, potential within the melt, is normally discharged through the refractory; however, as is common practice, a separate current is carried through the bushing to maintain the molten glass temperature prior to feeding the fiberizing spinner; and, with the presence of iron oxide in the molten material, this current within the drain bushing provides a lower resistance to ground causing the iron oxide to be reduced to iron at the drain bushing. This, in turn, results in grain boundary embrittlement of the platinum/platinum alloy drain bushing and subsequent cracking.

Basalt, which for example, contains in excess of about 8 percent and typically about 15 percent iron oxide, is one material used to form glass and the use of which has resulted in very short bushing life due to such cracking.

During the production of glass fibers, the drain bushing operates at temperatures in excess of 2000° F. (1093° C.). Since melted glass is introduced into the drain bushing and must remain in the melted state during its residence, an ac voltage is applied to the drain bushing to heat it and assist in controlling the flow rate of the glass melt through the bushing. Inasmuch as such bushings are fabricated from platinum or platinum alloys, which are expensive and the bushings themselves are expensive to cast, there is a need in the art to avoid the destruction of these bushings. The mode of cracking of a platinum or platinum alloy drain bushing is the same as that which platinum experiences when it is cathodically polarized in molten glass; that is, the drain bushing becomes part of an ac circuit when current is applied for heating the bushing, but it does not remain at the same potential as the glass and the refractory, so a dc current is established on the bushing. When a cathodic dc bias is developed on the bushing in this manner, in a basalt or other high iron oxide type glass, the iron oxide within the glass melt is reduced to iron, causing grain boundary embrittlement of the platinum alloy and the bushing life is substantially shorter than economical processing can tolerate. This invention is therefore directed to the solution of that problem.

This cracking problem, as indicated above, is characteristic of high iron oxide bearing glass batch materials, e.g., those containing greater than about 8 percent by weight of iron oxide. It will be noted that no distinction is made herein between glass and mineral fibers, that is, glass fibers comprehend mineral fibers unless expressly indicated to the contrary. Glass batch containing iron oxide in such amounts to degrade the bushing is referred to herein as containing iron oxide in a bushing degrading amount.

The present invention has, as an objective, retarding bushing degradation by glass batch containing iron oxide in a bushing degrading amount. Essentially, the problem is solved by substantially eliminating the passage of current directly through the bushing for heating. In lieu of directly heating, there is employed a conductive heating means.

STATEMENT OF THE INVENTION

According to this invention, the heating of glass fiber-forming bushings which comprises a drain bushing and the consequent retardation, if not the elimination of, bushing cracking is effected by employing an external electrical resistance heating element and an electrically insulating barrier means for preventing current flow positioned in contact with the bushing and the heating element.

The heating element is desirably of a material selected from the group consisting of molybdenum disilicide, stannous oxide and a platinum-rhodium composite comprising about 25 weight percent platinum and the barrier is desirably chromium oxide or aluminum oxide. The heating element may also be a base metal alloy which forms an oxidation resistant scale at high temperatures, and the scale serves as the electrical barrier. The barrier is shaped to contact both the bushing and the exit from the bushing into the spinner.

The present invention is an improvement in the manufacture of high iron oxide containing batch by retarding bushing degradation. This is done by passing heat needed for heating the bushing from the externally disposed heating element through an electrical insulating barrier to the bushing. Thus, substantially all the heat to the bushing is conductively supplied to the bushing as opposed to the current commercial practice of electrically heating the bushing by passing current directly through the bushing.

DESCRIPTION OF THE DRAWING

The drawing illustrates an apparatus capable of performing the present method. The drawing is an elevation view taken through the vertical center line of the bushing.

DESCRIPTION OF THE INVENTION

The invention can be used with a bushing of any configuration. It is particularly suitable for use with a bushing having a bottom exit around which the barrier and heating element can be positioned.

The heating element of this invention can be comprised of any suitable material and can be of any suitable shape. Preferably, it will be fabricated from a material selected from the group consisting of molybdenum disilicide, stannous oxide and a platinum-rhodium composite comprising about 75 weight percent platinum and about 25 weight rhodium.

The electrical barrier can be of any electrical insulating material capable of preventing current flow and having a heat resistance capacity sufficient to resist the high temperatures involved. Preferably, it will be comprised of aluminum oxide.

The barrier can be of any suitable shape. Preferably, it will be of a size sufficient to contact a major portion of the drain bushing and will be positioned to lie in contact with, and conform in shape with, a major portion of the outlet from the bushing. The barrier can be a separate entity or can be sprayed or otherwise applied to the surface of the heating element or bushing before it is assembled.

Referring now to the drawing, there is shown drain bushing 1 comprised of a molten glass holding portion 2, an outlet 3 and outlet orifice 4.

Electrical barrier 5 is positioned in contact with outer wall surface 6 of bushing 1 and is of a size sufficient to extend over a substantial portion thereof. Barrier 5 is also extended to substantially encompass the outer surface of orifice 4 and form between the outer wall and the outlet an electrical shield barrier between the bushing and electrical heating element 7. Preferably, electrical heating element 7 will comprise a drilled plate contacting a substantial portion of barrier 5 and will be sufficient to size and current-carrying capacity to provide sufficient energy to maintain the glass in the drain bushing in molten condition so it can flow from outlet 3 and be attenuated into glass fibers.

Surprisingly, it was discovered that the problem of bushing degradation, resulting from the presence of iron oxide in a bushing degrading amount in the glass batch, is greatly reduced by substantially eliminating the passage of current directly through the bushing for heating and employing a conductive heating method. In order to maintain the required elevated drain bushing temperature for fiberization process, there is now employed a conductive heating method in which the heat generated by a resistance heating element 7 is passed through an electrical insulating barrier 5 to bushing 1.

It will be evident from the foregoing that various modifications can be made to this invention. Such, however, are considered within the scope of the invention.

I claim:

1. In a method of manufacturing glass fibers comprising electrically melting fiberizable glass forming batch in a main glass melter, supplying the melted batch to a heated platinum, or platinum alloy, bushing and forming fibers from molten glass emitted from said bushing, the improvement wherein said batch contains iron oxide in a bushing degrading amount and comprising retarding the bushing degradation by passing heat from a lower exteriorly disposed electrical heating element through an electrically insulating barrier to said bushing.

2. The method of claim 1 wherein said barrier is in contact with said bushing and said heating element and electrically isolates them.

3. The method of claim 1 wherein the glass forming batch is basalt.

4. The method of claim 1 wherein the iron oxide is found in amounts greater than about 8 percent by weight.

5. The method of claim 1 wherein the electrically insulating material is chrominum oxide or aluminum oxide.

6. The method of claim 1 wherein said heating element is fabricated from a material selected from the group consisting of molybdenum disilicide, stannous oxide and a platinum-rhodium composite comprising about 25 weight percent platinum.

7. A method of making glass fibers by melting particulate batch ingredients or minerals in an electric furnace by Joule effect wherein the molten glass is passed through an electrically heated platinum or platinum alloy drain bushing feeding a spinner from which fibers are centrifically ejected, the improvement wherein the batch contains iron oxide in bushing degrading amounts and comprising:

(a) passing heat from an externally disposed heating element through an electrical insulating barrier to the bushing, said insulating barrier being positioned between and in contact with the bushing and the electrical heating element.

* * * * *